United States Patent
Shehan et al.

[19]

[11] Patent Number: 6,122,588
[45] Date of Patent: Sep. 19, 2000

[54] VEHICLE SPEED CONTROL WITH CONTINUOUSLY VARIABLE BRAKING TORQUE

[75] Inventors: Mark Alan Shehan, Ypsilanti; Dale Scott Crombez, Livonia, both of Mich.; Jack H. Xu, Plochingen, Germany

[73] Assignee: Ford Global Technologies, Inc., Dearborn, Mich.

[21] Appl. No.: 09/420,465

[22] Filed: Oct. 19, 1999

[51] Int. Cl.[7] .............................. B60T 8/32; G05D 1/00; G06F 7/00; G06F 17/00
[52] U.S. Cl. .............................. 701/93; 701/70; 180/169; 180/167; 180/179; 180/170; 180/176; 303/20; 303/122.06
[58] Field of Search .............................. 701/93, 96, 110, 701/70, 22; 180/179, 170, 176, 65.1, 65.2, 65.3, 65.5, 65.6, 65.7, 169, 167; 123/352; 303/122.06, 20

[56] References Cited

U.S. PATENT DOCUMENTS

| | | |
|---|---|---|
| 4,908,553 | 3/1990 | Hoppie et al. . |
| 5,081,365 | 1/1992 | Field et al. . |
| 5,088,041 | 2/1992 | Tanaka et al. . |
| 5,198,982 | 3/1993 | Kobayashi ................................. 701/86 |
| 5,352,028 | 10/1994 | Eccleston . |
| 5,415,245 | 5/1995 | Hammond . |
| 5,480,220 | 1/1996 | Kumar ..................................... 303/151 |
| 5,539,641 | 7/1996 | Littlejohn ................................. 701/70 |
| 5,568,023 | 10/1996 | Grayer et al. . |
| 5,615,933 | 4/1997 | Kidston et al. . |
| 5,713,426 | 2/1998 | Okamura . |
| 5,786,640 | 7/1998 | Sakai et al. . |
| 5,799,262 | 8/1998 | Suzuki ..................................... 701/93 |
| 5,823,280 | 10/1998 | Lateur et al. . |
| 6,052,644 | 4/2000 | Murakami et al. ....................... 701/93 |

*Primary Examiner*—William A. Cuchlinski, Jr.
*Assistant Examiner*—Olga Hernandez
*Attorney, Agent, or Firm*—Allan J. Lippa; Roger L. May

[57] ABSTRACT

A system and method for reducing speed of a vehicle to maintain a target vehicle speed include determining an actual vehicle speed, comparing the target vehicle speed to the actual vehicle speed to generate a speed error, determining a continuously variable braking torque as a function of the speed error when the actual vehicle speed exceeds the target vehicle speed, and applying the continuously variable braking torque to at least one wheel of the vehicle to reduce the speed error toward zero and control the speed of the vehicle. The present invention is applicable to vehicles powered by an internal combustion engine, electric vehicles, fuel cell vehicles, and hybrid vehicles. The continuously variable braking torque may be applied using regenerative braking to improve fuel efficiency. Friction brakes may also be utilized either alone, or in combination with regenerative braking, for vehicles capable of brake-by-wire control strategies.

17 Claims, 4 Drawing Sheets

VEHICLE SPEED CONTROL WITH CONTINUOUSLY VARIABLE BRAKING TORQUE

TECHNICAL FIELD

The present invention relates to a system and method for controlling vehicle speed using continuously variable braking torque.

BACKGROUND ART

Traditional vehicle speed control or cruise control systems control power provided by the prime mover to control vehicle speed. For internal combustion engines, speed is controlled by controlling the amount of fuel provided to the engine. Likewise, for electric or fuel cell powered vehicles, the energy supply to the traction motor(s) is controlled to control the speed of the vehicle. These systems can supply a limited amount of negative or braking torque to the drive train to decelerate the vehicle and maintain a set cruising speed. Negative torque may be provided using engine compression braking (which may alter valve timing) for internal combustion engines, or regenerative braking for electric vehicles, for example. However, this limited amount of negative torque is often insufficient to maintain a set cruising speed under various operating conditions, such as descending a long or steep grade.

Prior art speed control strategies provide additional negative torque or braking torque using a graduated or stepped activation of regenerative braking, engine braking, and/or service (friction) braking. While this approach may be acceptable for some applications, transitions between braking modes may be noticeable and objectionable to the driver.

SUMMARY OF THE INVENTION

It is an object of the present invention to provide a system and method for controlling speed of a vehicle using continuously variable braking torque to maintain a predetermined set speed.

Another object of the present invention is to provide a system and method for controlling vehicle speed using continuously variable regenerative braking to perform closed loop feedback control of vehicle speed.

In carrying out the above object and other objects, advantages, and features of the present invention, a system and method for reducing speed of a vehicle to maintain a target vehicle speed include determining an actual vehicle speed, comparing the target vehicle speed to the actual vehicle speed to generate a speed error, determining a continuously variable braking torque as a function of the speed error when the actual vehicle speed exceeds the target vehicle speed, and applying the continuously variable braking torque to at least one wheel of the vehicle to reduce the speed error toward zero and control the speed of the vehicle. The present invention is applicable to vehicles powered by an internal combustion engine, electric vehicles, fuel cell vehicles, and hybrid vehicles. The continuously variable braking torque may be applied using regenerative braking to improve fuel efficiency. Friction brakes may also be utilized either alone, or in combination with regenerative braking, for vehicles equipped with braking systems capable of independent brake actuation (brake-by-wire).

The present invention provides a number of advantages over prior art control strategies. For example, the present invention uses a closed-loop feedback controller to provide a continuously variable braking torque to one or more wheels to smoothly control or maintain a desired vehicle cruising speed. The present invention improves authority of control and maintains the desired vehicle speed under more diverse road conditions than prior art strategies. The continuously variable braking torque provides seamless transitions and improves drivability.

The above advantages and other advantages, objects, and features of the present invention, will be readily apparent from the following detailed description of the best mode for carrying out the invention when taken in connection with the accompanying drawings.

BEST MODE(S) FOR CARRYING OUT THE INVENTION

Figure 1:
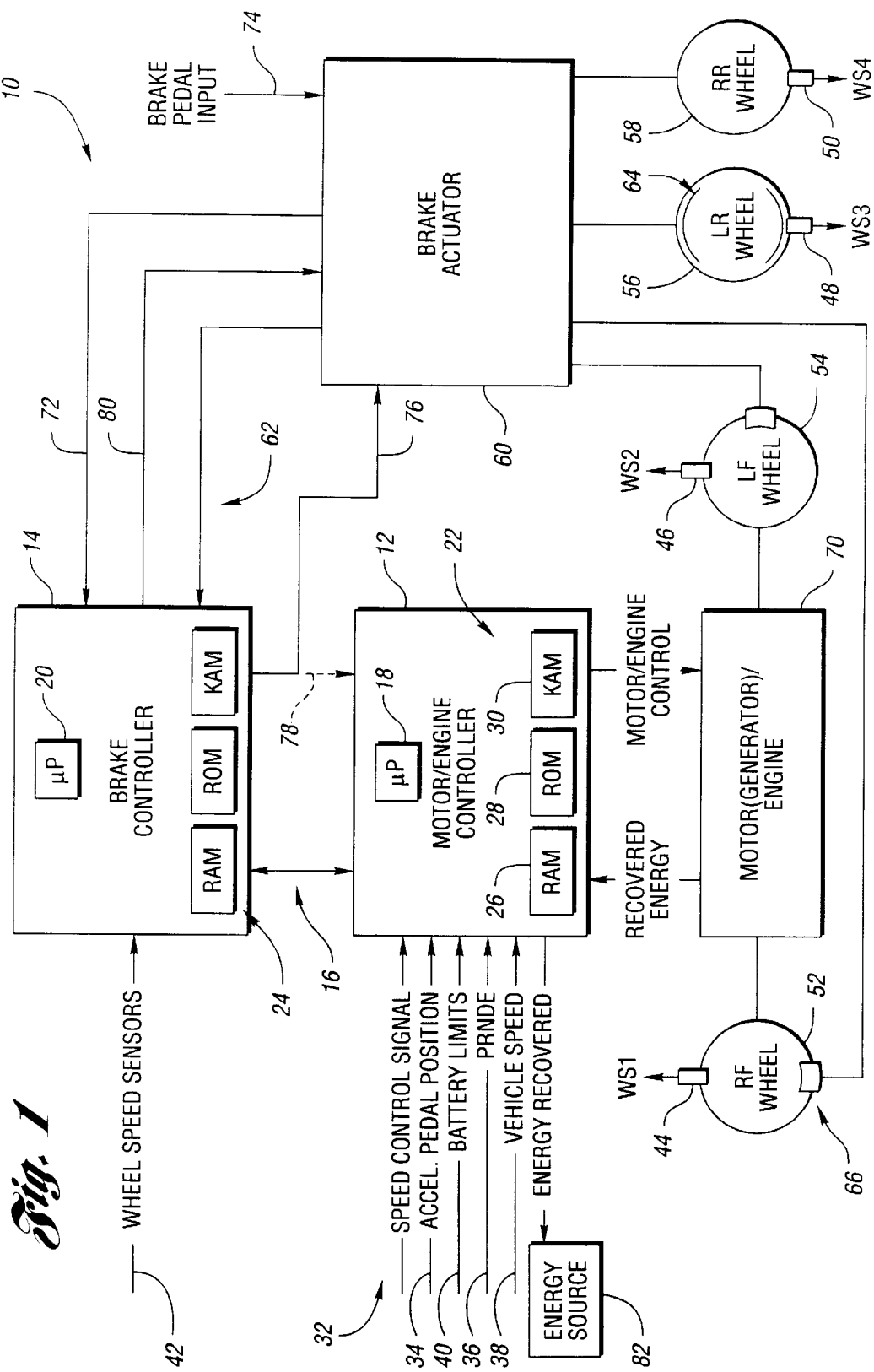
FIG. 1 is a block diagram illustrating a system or method for applying a continuously variable braking torque according to the present invention.

Referring now to FIG. 1, a block diagram illustrating operation of a system or method for reducing speed of a vehicle to maintain a target vehicle speed according to the present invention is shown. System 10 preferably includes a first controller 12, such as a motor or engine controller, in communication with a second controller 14 via an appropriate communication link 16. Second controller 14 is preferably a brake controller. Communication link 16 preferably conforms to a intra-controller bus standard, but is at least capable of exchanging information and commands relative to current operating conditions and control of the vehicle. Depending upon the particular application, first controller 12 may be either an engine controller, such as used for internal combustion engines, or a motor controller, such as used for electric or fuel cell vehicles. Similarly, controller 12 may be used to control a hybrid system which utilizes one or more types of prime movers to power the drive train of a vehicle.

In one preferred embodiment of the present invention, controllers 12 and 14 comprise microprocessor-based controllers with associated microprocessors, represented by reference numerals 18 and 20, respectively. The microprocessors communicate with associated computer-readable storage media 22 and 24, respectively. As will be appreciate by one of ordinary skill in the art, computer-readable storage media may include various devices for storing data representing instructions executable by the microprocessor to control the engine, motor, or braking systems. For example, computer-readable storage media may include a random access memory (RAM) 26, a read-only memory (ROM) 28, and/or a keep-alive memory (KAM) 30. These functions may be effected through any of a number of known physical devices including EPROM, EEPROM, flash memory, and the like. The present invention is not limited to a particular type of computer-readable storage medium, examples of which are provided for convenience of description only.

Controllers 12 and 14 also include appropriate electronic circuitry, integrated circuits, and the like to effect control of the motor, engine, or braking systems. As such, controllers 12 and 14 are used to effect control logic implemented in terms of software (instructions) and/or hardware components, depending upon the particular application. Additional details of control logic implemented by controllers 12 and 14 according to the present invention are provided with reference to FIGS. 2–4.

Controller 12 receives various signals from sensors to monitor current operating conditions of the vehicle. For example, signals may include one or more cruise control signals, indicated generally by reference numeral 32, an accelerator pedal position signal 34, a gear selector signal 36, and a vehicle speed signal 38. Depending upon the particular application, additional signals may also be provided, such as battery limit signal 40. Controller 12 may be in direct communication with associated sensors, switches, and other input devices, or may receive information relative to sensed parameters via another controller, such as controller 14. Likewise, controller 14 may receive various information relative to current operating conditions from controller 12. In addition, controller 14 also preferably communicates directly with various sensors to provide corresponding signals, such as wheel speed signals 42.

In one embodiment of the present invention, wheel speed signals 42 correspond to signals provided by corresponding wheel speed sensors 44, 46, 48, and 50 associated with corresponding wheels 52, 54, 56, and 58, respectively. Each wheel speed sensor provides a signal indicative of the rotational speed of the corresponding wheel. The signals are processed by controller 14 to provide appropriate braking control, such as anti-lock braking, described in greater detail below.

Brake controller 14 preferably receives inputs from a braking subsystem or brake actuator 60 indicative of current operating conditions of the braking system. For example, controller 14 may receive brake system pressures 62 indicative of a pneumatic or hydraulic pressure for operating one or more braking devices which may include any device which applies a negative torque to wheels 52–58. For example, a braking device includes various types of frictions brakes, such as drum brakes 64 and disk brakes 66. In addition, a braking device may be implemented by a traction motor/generator, represented generally by reference numeral 70 which applies a negative or retarding torque when used as a braking device. This device may be directly coupled to one or more wheels 52–58 via an appropriate mechanical or hydraulic linkage. Controller 14 may also receive a signal or message indicative of brake pedal position as represented by reference numeral 72. Alternatively, brake pedal position signal 72 may be provided directly from a sensor associated with a brake pedal (not shown) or may be provided indirectly through brake actuator 60. For conventional hydraulic or pneumatic braking systems, a brake pedal input 74 provides a fluid coupling between the associated brake pedal (not shown) and brake actuator 60. This fluid signal may be converted to an appropriate electrical signal to provide the brake pedal position signal or message 72.

Controller 14 processes the signals received from various sensors and messages from controller 12, which may include appropriate requests for system braking to generate a continuously variable braking torque as described in greater detail below. Controller 14 may also include various other braking functions and provide appropriate signals such as the anti-lock braking (ABS) control signal 78.

As also illustrated in FIG. 1, controller 14 may request braking torque to be supplied by one or more braking devices. For example, in vehicles having conventional hydraulic or electro-mechanical braking systems and also utilizing an electric motor/generator, controller 14 may generate braking commands for application of friction brakes 76 in addition to application of a negative motor torque 78. Preferably, in applications where motor 70 can provide a negative braking torque, regenerative braking is utilized such that motor 70 supplies energy through controller 12 to an associated energy or fuel source 82 to increase the fuel or energy efficiency of the vehicle. Alternatively, controller 12 may use energy supplied by motor/generator 70 to service various other electrical loads, such as those demanded by vehicle accessories.

In operation, system 10 receives one or more signals representing the actual vehicle speed, such as the vehicle speed signal 38 or wheel speed signals 42, to determine an actual vehicle speed. The actual vehicle speed is compared to a target or desired vehicle speed which may be indicated by a cruise control set speed 32, for example. The target or desired vehicle speed is compared to the actual vehicle speed to generate a speed error. The speed error is used to determine a continuously variable braking torque when the actual vehicle speed exceeds the target vehicle speed. This determination may be made by controller 12 and/or controller 14. In one preferred embodiment, controller 12 generates the speed error, reduces the motor/engine torque, and determines whether additional braking torque is required. This request is communicated to controller 14 via communication link 16. Controller 14 determines the availability of one or more braking devices, selects an appropriate braking device, and controls the selected braking device(s) to apply the continuously variable braking torque to at least one wheel 52–58 of the vehicle to reduce the speed error toward zero.

Figure 2:
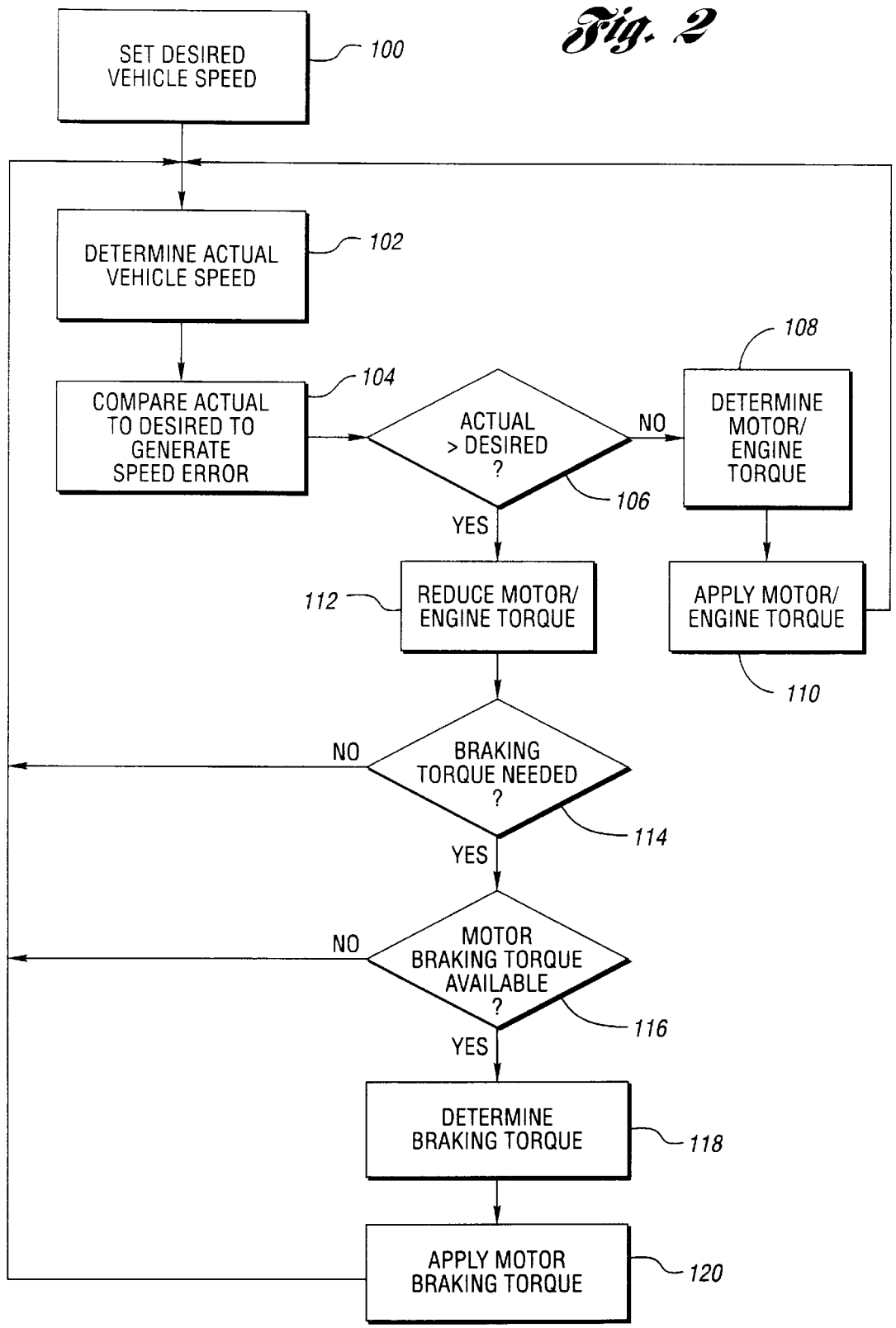
FIG. 2 is a flowchart illustrating control logic for one embodiment of the present invention in a vehicle having regenerative braking capability.
Figure 3:
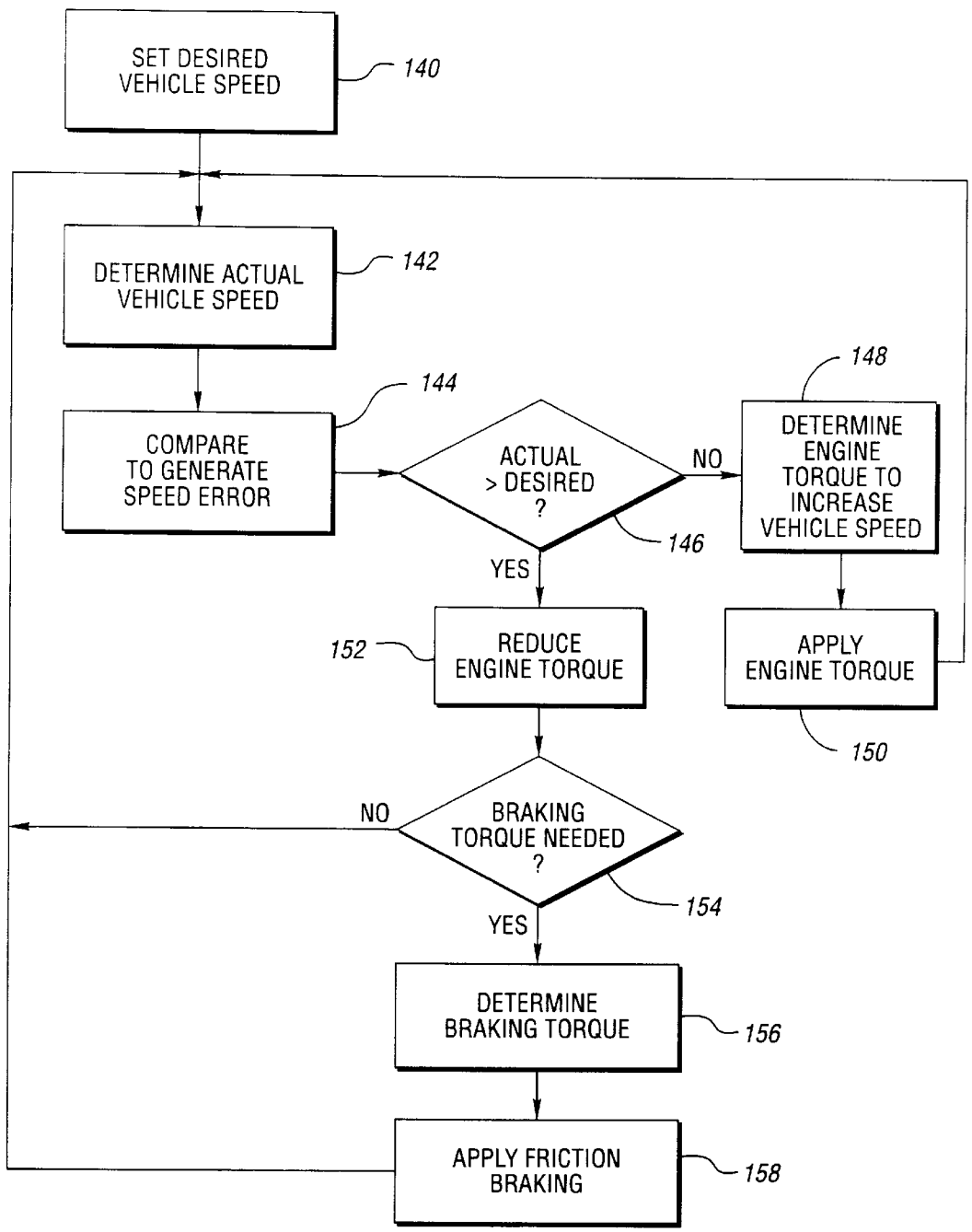
FIG. 3 is a flowchart illustrating control logic for another embodiment of the present invention in a vehicle having friction brakes and a brake-by-wire control strategy.
Figure 4:
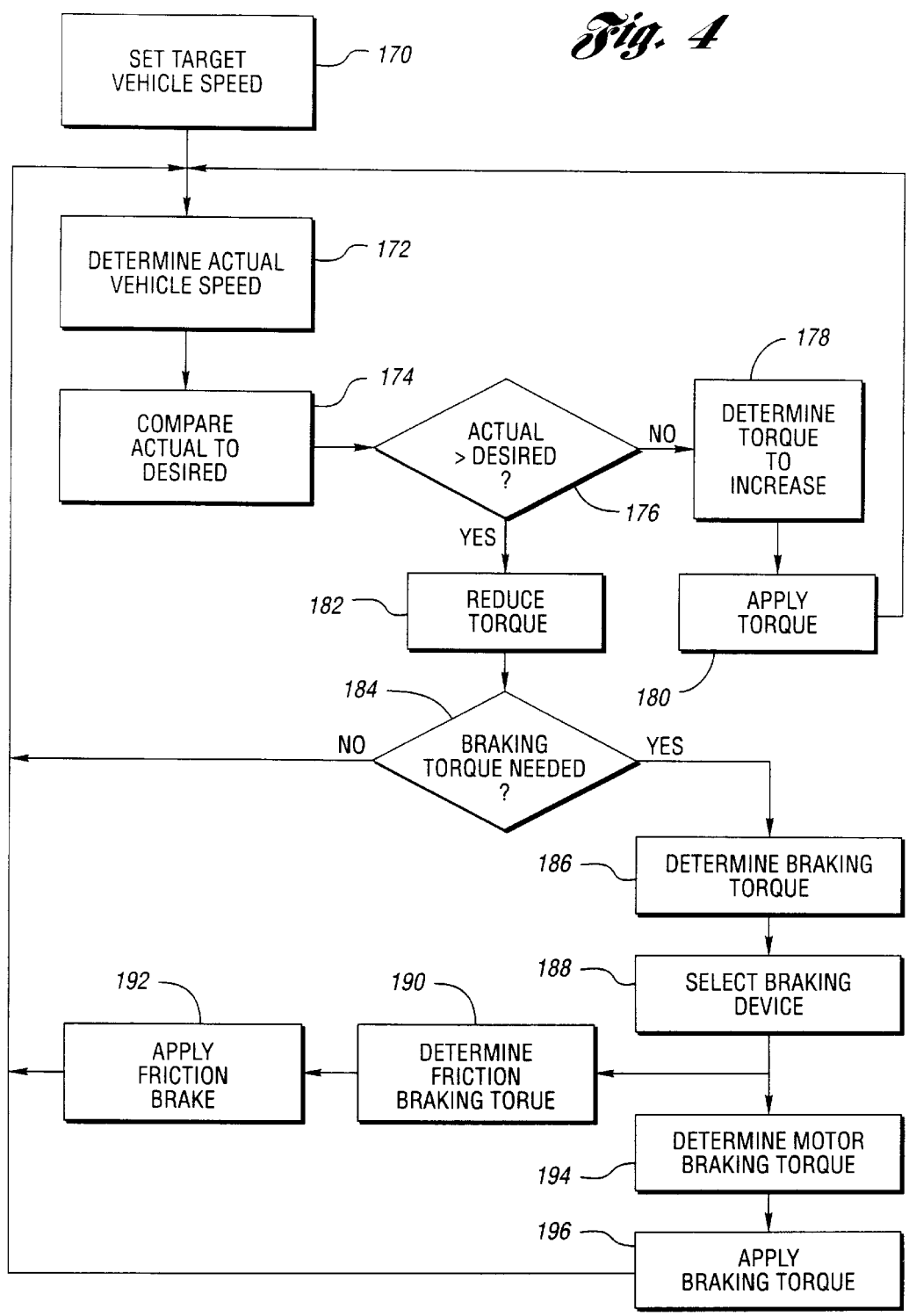
FIG. 4 is a flowchart illustrating control logic for one embodiment of the present invention in a vehicle having brake-by-wire and regenerative braking capability.

Referring now to FIG. 2, a flowchart illustrating control logic of one embodiment of the present invention is shown. As will be appreciated by one of ordinary skill in the art, the flowcharts illustrated in FIGS. 2–4 may represent any of a number of known processing strategies which may include event-driven, interrupt-driven, multi-tasking, multi-threading, and the like. As such, various steps or functions illustrated may be performed in the sequence shown, in parallel, or in some cases omitted. Likewise, the order of processing is not necessarily required to achieve the objects, features, and advantages of the present invention, but is provided for ease of illustration and description only. Preferably, the control logic illustrated in FIGS. 2–4 is implemented primarily in software which is executed by one or more microprocessor-based controllers. Of course, the control logic may be implemented in software, hardware, or a combination of software and hardware, depending upon the particular application.

The flowchart of FIG. 2 illustrates control logic for one embodiment of the present invention in a vehicle having regenerative braking capability. In this embodiment, the vehicle includes a conventional friction braking system which is directly controlled by the vehicle operator via an associated brake pedal. A target or desired vehicle speed is determined as represented by block 100. The desired or target vehicle speed may be indicated by the vehicle operator via an appropriate switch, such as a cruise control set speed switch. Alternatively, a desired or target vehicle speed may be determined based upon a desired following distance and/or closure rate for vehicles equipped with appropriate sensors to follow a forward vehicle at a selected distance or headway.

The actual vehicle speed is then determined as represented by block 102. The vehicle speed may be determined by an associated vehicle speed sensor, typically sensing rotational speed of a vehicle drive shaft, or may be provided by one or more wheel speed sensors. The target vehicle speed is compared to the actual vehicle speed to generate a corresponding speed error as represented by block 104. If the speed error is within predetermined limits, a torque correction or adjustment is not required and control returns back to block 102. If the actual vehicle speed is less than the desired vehicle speed as determined by block 106, additional engine/motor torque is requested as indicated by block 108. The additional torque is then applied to the associated wheel or wheels as is indicated by block 110. For internal combustion engine applications, additional torque is typically provided by controlling the quantity of fuel delivered to the engine. For electric or hybrid fuel vehicles, additional torque may be provided by increasing the energy available to the motor/generator. Of course, for hybrid vehicles, additional torque may be provided by an internal combustion engine in combination with an associated traction motor.

When actual vehicle speed exceeds the desired vehicle speed by a predetermined amount as represented by block 106, a negative or braking torque is required to maintain or control the speed of the vehicle. Block 112 attempts to reduce the vehicle speed by reducing the corresponding torque provided by the motor and/or engine of the vehicle. When the engine and/or motor torque has been reduced to its minimum level, which may correspond to idling or fuel cutoff of an internal combustion engine, block 114 determines whether additional braking torque is required. If no additional braking torque is necessary to maintain the desired vehicle speed, corresponding to a speed error approaching zero, then control returns to block 102.

If additional braking torque is required as indicated by block 114, block 116 determines whether a motor/generator is available to provide additional braking torque. If no additional braking torque is available from one or more motors/generators, control returns to block 102. If additional braking torque is available, block 118 determines a continuously variable braking torque as a function of the speed error and generates an appropriate command or signal to a braking actuator which controls actual application of the braking torque to at least one wheel of the vehicle as represented by block 120. Control then passes back to block 102.

As will be appreciated by one of ordinary skill in the art, the control functions or steps illustrated with respect to FIGS. 2–4 are preferably repeated at predetermined time intervals or based upon a predetermined event. The control logic may include various nested loops which execute repeatedly to provide timely information to the associated controller or controllers representative of current vehicle operating conditions.

Referring now to FIG. 3, a flowchart illustrating operation of a system or method according to the present invention in a vehicle having friction braking and a brake-by-wire control strategy is shown. As known, a brake-by-wire control strategy may use a sensor to determine position of the brake pedal, pedal effort (pressure), or both. The brake pedal position is processed by an appropriate controller to generate a corresponding braking request depending upon the particular operating conditions of the vehicle. The braking request is used to control an associated actuator which applies the hydraulic/pneumatic or electric signals to the braking device(s) to effect braking of the vehicle. Typically, there is no direct mechanical or fluid coupling between the brake pedal controlled by the operator and the actual braking devices. As such, the braking controller may determine an appropriate amount of braking torque to be applied to one or more wheels of the vehicle based upon the current operating conditions.

A desired or target vehicle speed is determined as represented by block 140. An actual vehicle speed is determined as represented by block 142. The actual and target speeds are compared to generate a speed error signal as represented by block 144. Preferably, a closed loop controller operates on the speed error to generate an appropriate command which reduces the speed error toward zero. Various types of closed-loop controllers may be used in accordance with the teachings of the present invention. For example, a proportional-integral-differential (PID) controller with appropriate gains may be used to reduce the speed error toward zero. As such, the closed-loop controller would generate an appropriate torque command or request to maintain a particular vehicle set speed. One or more controllers may be used to provide control of positive and negative torque. Preferably, separate feedback controllers are utilized to provide positive and negative torque, respectively. The controllers are preferably implemented in software and may be effected or executed by a single microprocessor-based computer or controller.

Block 146 of FIG. 3 determines whether the actual vehicle speed exceeds the desired vehicle speed. When actual vehicle speed is less than the desired vehicle speed, block 148 determines an appropriate engine torque to increase the actual vehicle speed. Block 150 controls application of the positive torque by controlling the appropriate actuators, such as fuel injectors or the like.

When actual vehicle speed exceeds the desired vehicle speed, the present invention attempts to reduce the actual vehicle speed by first reducing engine torque as represented by block 152. Block 154 determines whether additional braking torque is required to maintain the actual vehicle speed within a predetermined range of the desired vehicle speed. If additional braking torque is required as represented by block 154, a continuously variable braking torque is determined based on the speed error as represented by block 156. The continuously variable braking torque may be determined as a function of the derivative or rate of change of the speed error, the magnitude of the speed error, or a combination thereof. The variable braking torque determined by block 156 is applied to at least one braking device as represented by block 158. This step may include actuation of one or more friction brakes associated with corresponding wheels of the vehicle.

FIG. 4 is a flowchart illustrating control logic for another embodiment of the present invention for a vehicle having both brake-by-wire and regenerative braking capabilities. A desired or target speed is determined as indicated by block 170. An actual vehicle speed is determined as indicated by block 172. The actual vehicle speed is compared to the desired vehicle speed as represented by block 174 to generate a speed error signal. If the actual vehicle speed is within a predetermined range of the desired speed as indicated by the speed error, no additional action is required. However, if the actual vehicle speed is less than the desired vehicle speed as indicated by block 176, block 178 determines the additional torque required to increase the vehicle speed. Block 180 controls the appropriate devices to provide the additional torque. This may include providing additional fuel/energy to an appropriate motor and/or applying additional fuel to an internal combustion engine to increase the vehicle speed.

When the actual vehicle speed exceeds the desired vehicle speed as determined by block 176, such as may occur when descending a grade, block 182 attempts to reduce the vehicle speed by reducing the available motor and/or engine torque. Block 184 determines whether additional braking torque is required to maintain the vehicle set speed. If additional torque is required, block 186 determines the amount of braking torque. Block 188 selects one or more braking devices to provide the requested braking torque determined by block 186.

If requested by block 188, block 190 determines an appropriate braking torque to be supplied by one or more friction brakes which are then applied as indicated by block 192. Likewise, block 194 determines an appropriate amount of motor braking torque consistent with the braking request of block 188. Motor braking torque may be provided by supplying energy to a motor which resists rotation of the vehicle wheels, by regeneratively braking the motor such that the motor acts as a generator and supplies energy to an associated energy source, or by selectively connecting the motor to an associated load as represented by block 196.

As such, the present invention provides seamless transitions between braking modes by providing a continuously variable braking torque to at least one braking device to reduce the speed of a vehicle to maintain a target or desired vehicle set speed.

While the best mode for carrying out the invention has been described in detail, those familiar with the art to which this invention relates will recognize various alternative designs and embodiments for practicing the invention as defined by the following claims.

What is claimed is:

1. A method for reducing speed of a vehicle to maintain a target vehicle speed, the method comprising:
    determining an actual vehicle speed;
    comparing the target vehicle speed to the actual vehicle speed to generate a speed error;
    determining a continuously variable braking torque as a function of the speed error when the actual vehicle speed exceeds the target vehicle speed; and
    applying the continuously variable braking torque to at least one wheel of the vehicle to reduce the speed error toward zero and control the speed of the vehicle.

2. The method of claim 1 wherein the vehicle includes a motor/generator coupled to the at least one wheel and in communication with an energy source and wherein applying the continuously variable braking torque comprises regeneratively braking the vehicle such that the motor/generator supplies energy to the energy source.

3. The method of claim 2 wherein the vehicle further includes a friction brake associated with the at least one wheel and wherein applying the continuously variable braking torque further comprises actuating the friction brake.

4. The method of claim 1 wherein the vehicle includes a friction brake associated with the at least one wheel and wherein applying the continuously variable braking torque comprises actuating the friction brake.

5. The method of claim 1 wherein the vehicle includes a motor/generator coupled to at least one wheel and wherein applying the continuously variable braking torque comprises electrically coupling the motor/generator to an electrical load.

6. The method of claim 1 wherein the vehicle includes a first controller for controlling vehicle speed and a braking controller for controlling at least one friction brake coupled to at least one wheel, the method further comprising:
    communicating the continuously variable braking torque to the braking controller, wherein the braking controller performs the step of applying the continuously variable braking torque by actuating the friction brake.

7. The computer readable storage medium of claim 6 wherein the vehicle includes a motor/generator coupled to at least one wheel and wherein the instructions for applying the continuously variable braking torque comprise instructions for electrically coupling the motor/generator to an electrical load.

8. The computer readable storage medium of claim 6 wherein the vehicle includes a first controller for controlling vehicle speed and a braking controller for controlling at least one friction brake coupled to at least one wheel, the computer readable storage medium further comprising:
    instructions for communicating the continuously variable braking torque to the braking controller, wherein the braking controller performs the step of applying the continuously variable braking torque by actuating the friction brake.

9. A computer readable storage medium having stored data representing instructions executable by a computer to reduce speed of a vehicle to maintain a target vehicle speed, the computer readable storage medium comprising:
    instructions for determining an actual vehicle speed;
    instructions for comparing the target vehicle speed to the actual vehicle speed to generate a speed error;
    instructions for determining a continuously variable braking torque as a function of the speed error when the actual vehicle speed exceeds the target vehicle speed; and
    instructions for applying the continuously variable braking torque to at least one wheel of the vehicle to reduce the speed error toward zero and control the speed of the vehicle.

10. The computer readable storage medium of claim 9 wherein the vehicle includes a motor/generator coupled to the at least one wheel and in communication with an energy source and wherein the instructions for applying the continuously variable braking torque comprise instructions for regeneratively braking the vehicle such that the motor/generator supplies energy to the energy source.

11. The computer readable storage medium of claim 10 wherein the vehicle further includes a friction brake associated with the at least one wheel and wherein the instructions for applying the continuously variable braking torque further comprise instructions for actuating the friction brake.

12. The computer readable storage medium of claim 9 wherein the vehicle includes a friction brake associated with the at least one wheel and wherein the instructions for applying the continuously variable braking torque comprise instructions for actuating the friction brake.

13. A system for controlling speed of a vehicle capable of reducing speed of a vehicle to maintain a desired vehicle speed, the system comprising:
    a first controller having control logic for determining an actual vehicle speed, comparing the desired vehicle speed to the actual vehicle speed to generate a speed error, and generate a braking torque request representing a continuously variable braking torque as a function of the speed error when the actual vehicle speed exceeds the desired vehicle speed;
    a braking device coupled to at least one wheel of the vehicle for applying a braking torque to the at least one wheel in response to a braking signal
    a second controller in communication with the first controller and the braking device, the second controller receiving the braking torque request and generating a braking signal for the braking device to apply a continuously variable braking torque to at least one wheel of the vehicle to reduce the speed error toward zero.

14. The system of claim 13 wherein the braking device comprises an electric motor/generator.

15. The system of claim 13 wherein the braking device comprises a friction brake.

16. The system of claim 13 wherein the braking device comprises an electric motor/generator, the system further comprising a friction brake in communication with the second controller.

17. The system of claim 13 wherein the braking device comprises a motor/generator coupled to an energy source and wherein the braking signal activates regenerative braking of the vehicle such that energy is supplied to the energy source by the motor/generator.

* * * * *